Sept. 11, 1951        G. RABUTEAU        2,567,235

IMPEDANCE MATCHING ARRANGEMENT FOR HIGH-FREQUENCY ANTENNAE

Filed July 15, 1947        6 Sheets-Sheet 1

INVENTOR
GUY RABUTEAU
BY
ATTORNEY

Sept. 11, 1951   G. RABUTEAU   2,567,235
IMPEDANCE MATCHING ARRANGEMENT FOR HIGH-FREQUENCY ANTENNAE
Filed July 15, 1947   6 Sheets-Sheet 2

INVENTOR
GUY RABUTEAU
BY
ATTORNEY

Sept. 11, 1951   G. RABUTEAU   2,567,235
IMPEDANCE MATCHING ARRANGEMENT FOR HIGH-FREQUENCY ANTENNAE
Filed July 15, 1947   6 Sheets-Sheet 3

INVENTOR
GUY RABUTEAU
BY
ATTORNEY

Sept. 11, 1951          G. RABUTEAU          2,567,235

IMPEDANCE MATCHING ARRANGEMENT FOR HIGH-FREQUENCY ANTENNAE

Filed July 15, 1947          6 Sheets-Sheet 4

INVENTOR
GUY RABUTEAU
BY
ATTORNEY

Sept. 11, 1951  G. RABUTEAU  2,567,235
IMPEDANCE MATCHING ARRANGEMENT FOR HIGH-FREQUENCY ANTENNAE
Filed July 15, 1947  6 Sheets-Sheet 6

INVENTOR
GUY RABUTEAU
BY
ATTORNEY

Patented Sept. 11, 1951                                                                                  2,567,235

UNITED STATES PATENT OFFICE 2,567,235

IMPEDANCE MATCHING ARRANGEMENT
FOR HIGH-FREQUENCY ANTENNAE

Guy Rabuteau, Paris, France, assignor to International Standard Electric Corporation Inc., New York, N. Y., a corporation of Delaware Application July 15, 1947, Serial No. 761,081
In France June 20, 1939

Section 1, Public Law 690, August 8, 1946
Patent expires June 20, 1959

10 Claims. (Cl. 178—44)

The present invention relates to transmission systems of high frequency electric waves, and in particular high frequency systems using a very extended frequency band.

The invention in particular provides for devices for compensating in such systems injurious variations of resistance and/or reactance such as those resulting from the radiating elements used. It also provides for devices for coupling a symmetrical transmission system to an asymmetrical transmission system, or in another way to prevent certain types of electrical intereference from travelling predetermined portions of a transmission system.

The invention also provides for arrangements enabling the adaptation or appropriation of impedances of certain parts of a transmission system, or the introduction of selective frequency effects or any changes in phase and/or amplitude desired. In particular one of the objects of the invention is the realisation of rectifying devices for impedance variations as a function of the frequency for high frequency systems.

The invention also provides for various combinations of the above-mentioned devices, and in particular combinations of resistance or reactance compensator devices, with devices for coupling symmetrical systems to asymmetrical systems.

The invention in so far as these different objects and characteristics are concerned will be explained in detail in the following description, based on the attached drawings in which:

Figures 17-21 show the special details of the embodiment.

In the following description it is assumed that the devices proposed are intended to be connected to a high frequency emitter E transmitting on a large frequency band, for example, a band of 6 megacycles where the mean frequency is 60 megacycles, these devices being associated to a radiating or antenna system $An$ whose impedance varies in the frequency band under consideration.

Figure 1:
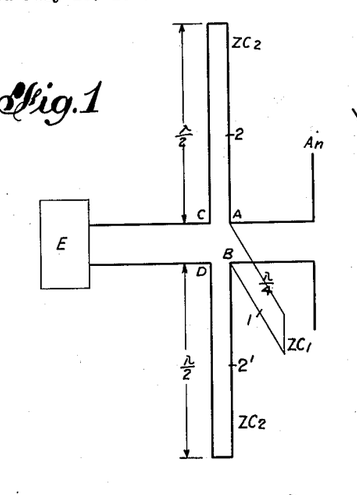
Figures 1, 3, 5 and 6 give various elementary examples of devices proposed for the compensation of variations in resistance and reactance, as shown in Figures 2 and 4, whilst
Figure 2:
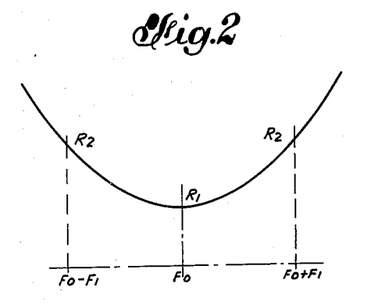

The arrangement of Figure 1 represents a compensation network arrangement to compensate the variations of the resistance represented on the Figure 2 of an antenna system $An$. On Figure 2 the radiation resistance of the antenna is shown by the ordinates and the frequency by the abscissae. This resistance which is minimum at the value $R1$ for the mean frequency $F0$ of the band varies symmetrically on each side of this mean frequency and becomes, for example, $R2$ for the frequencies $F0-F1$ and $F0+F1$, limiting frequencies on the band to be transmitted.

The device shown on Figure 1 comprises between the terminals A and B for connection to the antenna $An$ a short-circuited line 1 of a characteristic impedance $ZC1$ in length equal to a quarter of the mean wavelength of the band. The resistance to be compensated is assumed to be collected between the terminals A and B.

The terminals A and B of the compensator system are reunited at the terminals C and D by the lines 2 and 2' with a characteristic impedance $ZC2$ short-circuited at their ends and having a length equal to half the wavelength at a frequency $F0$, the mean frequency of the band.

The length and characteristic impedance of the line 1 are chosen in order that the impedance collected between the terminals A and B for the frequency $F0$ should be infinite, or at any rate very high, and in order that between the terminals A and B a reactance $X1$ should be introduced for the frequencies $F0-F1$, and $F0+1$, this reactance having the value given by the following formula $$X1 = \frac{R1 R2}{\sqrt{R1 R2 - R1^2}} \qquad (1)$$

In these circumstances, considering the interior of the network compensator in the direction of the arrow, the impedance presented between the terminals A and B is equal to $R1$ for a frequency $F0$ and to $R2+$ or $-j\, X2$ for frequencies $F0-F1$ and $F0+F1$. The value of $X2$ is as follows:

$$X2 = \sqrt{R2R1 - R1^2} \qquad (2)$$

On the other hand, the length and characteristic impedance of lines 2 and 2' are provided in such a manner that for the frequency $F0$ the impedance presented by these lines between the points A and C on the one hand, and B and D on the other hand should be nil, or very low; and that for frequencies $F0-F1$ and $F0+F1$ the impedances between the same points are of a value equal to $X2/2$ and of opposite signs.

In these conditions the impedance between the points C and D for the frequency $F0$ is equal to $R1$ and for the frequencies $F0-F1$ and $F0+F1$ the terms $$+\frac{X2}{2} \text{ and } -\frac{X2}{2}$$

introduced by the lines of characteristic impedance $ZC2$ compensate the reactive term of the same value, but of opposite sign which was introduced by the combination of the resistance $R2$ with the line $ZC1$.

The operation of a network of this kind can be better understood according to the numerical example given below.

The characteristics of the antenna system assumed to be connected to the terminals A and B being, for example, such that the resistance $R1$ has a value of 150 ohms for the frequency 60 megacycles, and a value of 165 ohms for the frequencies 57 and 63 megacycles, limiting frequencies of the band to be transmitted, the characteristic impedance $ZC1$ of the compensating line 1 connected between the terminals A and B is given by the formula:

$$ZC1 = X1 \operatorname{tg} \frac{\pi}{4} \frac{F1}{F0} = \frac{R1R2}{\sqrt{R1R2 - R1^2}} \operatorname{tg} \frac{\pi}{4} \frac{F1}{F0} \quad (3)$$

that is, about 41 ohms.

The value of the reactance introduced at the terminals A and B by the line 1 is very great for the frequency $F0$ (60 megacycles) and has one of $\pm 520$ ohms for the frequencies $F0-F1$ (57 megacycles) and $F0+F1$ (63 megacycles).

For frequencies $F0-F1$ and $F0+F1$ the impedance resulting from the combination at the terminals A and B of the antenna system $An$ and of the line 1 is 157.5 ohms with an angle of phase $=\pm 17$ degrees 30 minutes.

This impedance can obviously take the form of $R+jX$. In order to compensate the reactive term $X$ the characteristic impedance of the two lines 2 and 2′ inserted between the points A and C and B and D respectively should for the frequencies $F0-F1$ and $F0+F1$ be equal to $\pm X/2$ which corresponds to a characteristic impedance $ZC2$ given by the formula:

$$ZC2 = \frac{X2}{2 \operatorname{tg} \frac{F1}{F0} \frac{\pi}{4}} = \frac{\sqrt{R1R2 - R1^2}}{2 \operatorname{tg} \frac{F1}{F0} \frac{\pi}{4}} \quad (4)$$

The structure of the device of Figure 1 may be subjected to modification, for example, instead of a single line 1 of a length equal to ¼ of the medium wavelength of the band, and short-circuited at its end, it is possible to use several lines in parallel all of the same length, or of different lengths equal to uneven multiples of the ¼ of the wavelength. Equally, it is possible to use a single line 2 either between the terminals A and C, or between the terminals B and D, or to use between these terminals several lines of equal length, either of half-wave length or of a complete multiple of a half-wave length.

The network represented by Figure 1 is suitable for compensation of an antenna system, where the resistance represents a minimum on the mean frequency of the range to be transmitted.

For the compensation of an antenna system in which on the other hand the resistance would be maximum for the frequency $F0$ it is, however, possible to use the compensator network represented by the Figure 1, linking up the antenna system at the input terminals A and B of the compensating network by means of a transmission line having a characteristic impedance equal to the resistance presented by the antenna system for the frequency $F0$, and of a length equal to ¼ wavelength, the inverter transformer constituted by this line being assumed to remain perfectly within the frequency band $F0-F1$ and $F0+F1$.

It is also possible to invert the effect of the network, the antenna being connected to the terminals C and D which become the input terminals, the terminals A and B becoming the output terminals.

Figure 3:
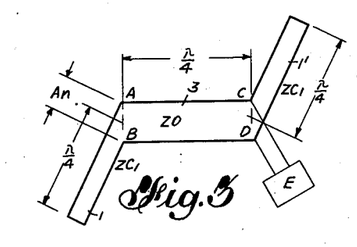

When the resistance of the antenna system varies in the manner shown in Figure 2 between the resistance values $R1$ and $R2$ the network shown in Figure 3 may also be used. This arrangement consists of a transmission line 3 connected between the terminals AB and CD. The characteristic impedance $Z0$ of this line is selected so as to be equal to the $\sqrt{R1R2}$, $R1$ and $R2$ being the value of the resistance presented by the antenna system for the frequencies $F0$, and the limiting frequencies $F0-F1$ and $F0+F1$ respectively.

The length of the transmission line 3 is equal to ¼ wavelength at a frequency $F0$. In what follows in the description as a first approximation of the variations of electric length in this line for frequencies $F0-F1$ and $F0+F1$ in relation to its length at a frequency $F0$ have been considered as negligible.

At terminals A and B, Figure 3, where the antenna system $An$ is connected, there is connected a line 1 of a length equal to ¼ wavelength at the frequency $F0$ and having a characteristic impedance $ZC1$. At the terminals C and D in parallel with the transmitter E a line L of the same characteristic impedance $ZC1$ as the line 1 has been connected.

For the frequency $F0$ the resistance $R1$ presented between the terminals A and B by the antenna system is transformed into a resistance of a value $R2$ at the terminals C and D by the inverter transformer 3. For one of the frequencies $F0-F1$, or $F0+F1$ the resistance presented by the antenna system between the terminals A and B is equal to $R2$ as may be seen on Figure 2.

In order to compensate this variation in resistance the short-circuited line 1 at the terminals A and B has a characteristic impedance determined in such a manner that for the two frequencies $F0-F1$ and $F0+F1$ the impedance which it introduces between the terminals A and B resulting from a combination of the resistance $R2$ presented by the antenna system and the impedance X presented by the line 1 has a modulous equal to the characteristic impedance of the line 3.

The modulus of the resulting impedance between the terminals A and B being equal to the characteristic impedance $Z0$ of the line 3 and the length of this line 3 being assumed to be equal to ¼ wavelength there is obtained between the terminals C and D an impedance equal to $Z0$, but whose angle of phase is inverse to that of the impedance existing between the terminals A and B.

The second transmission line 1′ with a characteristic impedance ZC1 which is connected between the terminals C and D has for frequencies $F0-F1$ and $F0+F1$ reactances of $+X$ and $-X$ which are of the same modulus but of opposed signs with relation to those tranferred to the terminals C and D by the line 3.

In this manner the reactive component introduced by the line 1 between the terminals A and B is exactly compensated by that which is introduced between the terminals C and D by the line 1' and a pure resistance equal to R2 is transferred between the terminals C and D for the frequencies $F0-F1$ and $F0+F1$.

Once more, taking the preceding numerical example, the characteristic impedance of the line linking up the terminals A and B to the terminals C and D is equal to the $\sqrt{R1 \times R2}$ that is, $$Z0 = \sqrt{150 \times 165} = 157 \text{ ohms} \quad (5)$$

For the frequencies $F0-F1$ and $F0+F1$, the impedance introduced between these terminals AB and CD by the lines of compensation 1 and 1' is determined by the formula:

$$ZC = XC \text{ tg } \frac{\pi}{4} \frac{F1}{F0} = R2 \sqrt{\frac{R1}{R2-R1}} \text{ tg } \frac{\pi}{4} \frac{F1}{F0} = 42 \text{ ohms} \quad (6)$$

In this device it is equally possible to make use between the terminals A and B of the one part and between the terminals C and D of the other part, of one or more compensation lines which are in length equal to the uneven multiples of the quarter of the wavelength.

The device represented on Figure 3 is suitable for the compensation of resistance of an antenna system where the resistance as shown in Figure 2 presents a minimum for the mean frequency of the wave band to be transmitted. For the compensation of the resistance of an antenna system whose resistance would be maximum for the frequency F0 this device could, nevertheless, be employed provided the antenna system were connected to the terminals A and B through the intermediaries of a transmission line with a characteristic impedance equal to the resistance presented by the antenna system for the frequency F0 and equal in length to ¼ wavelength at this frequency, the inverter transformer constituted by this line being assumed to remain perfect throughout the frequency range transmitted.

Figure 4:
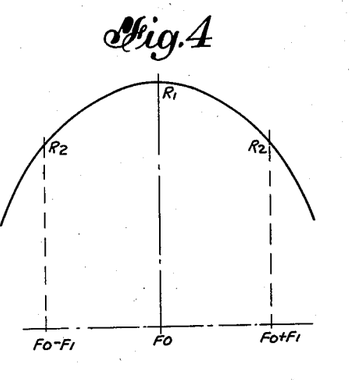
Figure 5:
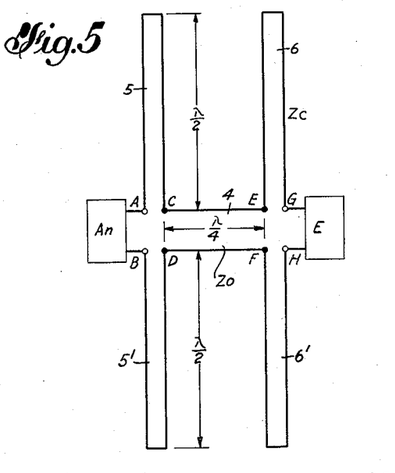

In the case of an antenna system where the variation of resistance to be compensated is reached as a function of the frequency on the curve of Figure 4 it is equally possible to use a compensation device such as that which is represented on Figure 5. This device does not necessitate the previous inversion by a ¼ wave line of the impedance of the antennae.

This device, as shown, consists between the terminals C and D and E and F, of a transmission line 4 of characteristic impedance Z0 equal to $\sqrt{R1 \times R2}$, R1 and R2 being the values of resistance of the antenna system An for the mean frequency, and the limiting frequencies respectively of the band to be transmitted, the length of this transmission line 4 being equal to a quarter of the wavelength at the mean frequency F0.

Between the terminals A—C, B—D, E—G and F—H there are respectively inserted lines 5, 5', and 6, 6', whose length is equal to half a wavelength at a frequency F0 and which are short-circuited at their ends. In the device in Figure 5 the terminals A and B are connected to the antenna system An and the terminals G and H to the transmitter E.

For the frequency F0 the resistance R1 introduced by the antenna system between the terminals A and B is transformed into a resistance R2 between the terminals G and H. For frequencies $F0-F1$ and $F0+F1$ the resistance introduced by the antenna system between the terminals A and B is equal to R2. The characteristic impedance ZC of the lines 5, 5', 6, 6' is determined in such a way that the impedance X presented between the terminals A—C, B—D, E—G and F—H of these lines is such that the impedance presented between the terminals C and B which is equal to $R+2jX$ has the same modulus as the characteristic impedance Z0 of the line 4.

In these conditions the impedance transferred to the terminals E and F becomes $R-2jX$ and the presence of lines 6, 6' between the terminals EG and FH annuls the reactive term 2X in such a way that between the terminals G and H there is a resistance value of R2 which is that presented by the antennae system at the terminals A and B.

In the devices described it was assumed that the ¼ wave transformers were perfect transformers within the frequency band proposed, that is to say, between $F0-F1$ and $F0+F1$. In practice these transformers not being perfect it is necessary to compensate them first.

A known compensation device for quarter-wave transformers consists in a quarter wave compensation line connected in parallel to the end of the lowest impedance of the transformer to be compensated, the characteristic impedance ZC of such a line being given by $$ZC = \frac{Z0}{\beta^2 - 1} \quad (7)$$

where $\beta$ is the transformation ratio of the transformer having a characteristic impedance Z0. For the frequency range proposed by way of example, that is to say, 57 to 63 megacycles, transformers suitably compensated in this way are perfect up to 1% approximately, for transformer ratios comprised between 1 and 3, that is to say, for an impedance ratio comprised between 1 and 9.

If in order to compensate the reactance introduced by a quarter wave transformer which is not compensated to frequencies other than those for which it is exactly one quarter wave, series reactances are used such as those which short-circuited semi-wave lines present at their ends, the reactance introduced by the quarter wave transformer at either side of the tuning frequency may be compensated, but instead of compensating variations of the transformation ratio resulting from the imperfection of the quarter wave transformer these variations are increased since the imperfection of the transformer increases.

Figure 6:
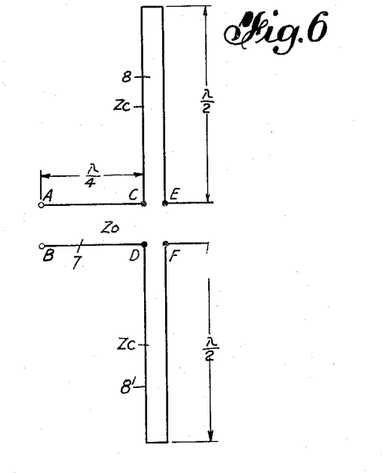

By selecting a transformer ratio in a suitable manner for the mean frequency F0 it is possible to use variations of this transformer ratio as a function of the frequency to compensate the variations of resistance of an antenna system, for example, variations represented on Figures 2 and 4. Figure 6 represents an example of compensation devices of this kind.

This device consists of a quarter wave transmission line 7 with a characteristic impedance Z0, associated with one or more compensation lines in series, such as 8 and 8' of a half wave length, and with an impedance ZC placed at the side of the quarter wave transformer 7 where the impedance is higher. The characteristic impedance ZC of each series compensation line is given by the equation:

$$ZC = \frac{Z0}{2}(\beta^2 - 1) \qquad (8)$$

Figure 7:
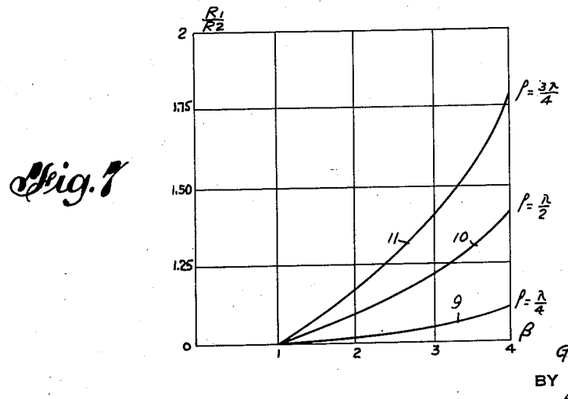
Figure 7 shows the effects produced by a device such as that in Figure 6.

The effect of a device such as that represented on Figure 6 is indicated on Figure 7 which gives as a function of the transformer ratio $\beta$ of the transformer 7 with a characteristic impedance Z0 the ratio between these resistances R1 and R2 which this transformer compensates for frequencies F0−F1, F0+F1 of 57 and 63 megacycles.

In order to compensate a variation in resistance such as that represented by the curve in Figure 2, that is to say, when the resistance R2 of the radiating system is greater for frequencies F0−F1 and F0+F1 than the resistance R1 for the mean frequency of the range to be transmitted, a transformer which increases the impedance should be used, that is to say, where a transformer whose characteristic impedance Z0 is greater than R1.

In order to compensate a variation in resistance such as that represented on the curve of Figure 4 a lower transformer should on the other hand be used, that is to say, a transformer whose characteristic impedance Z0 is smaller than the resistance R1.

It is obviously possible to increase or lower the resistance on one side or the other of a compensation device of the type represented in Figure 6 by means of compensated transformers. It is possible on the other hand to use in order to effect a compensation device such as that in Figure 6 transformers of multiple lengths of the quarter of the wavelength of the mean frequency. In this case the compensation of variations in resistances such as that represented on Figure 2 is obtained by means of transformers with a characteristic impedance Z0 which is greater than the value R1 of the resistance of the system radiated for the frequency F0, the length of the transformer being an uneven multiple of the quarter of the wavelength for the frequency F0.

The compensation of the variations of resistance such as those represented in Figure 4 can be obtained by means of characteristic impedance transformers Z0 less than the value R1, and of a length equal to a multiple of the quarter of the wavelength. In the case where this multiple is even the compensator device has a transformer ratio equal to the unit.

The curves represented by Figure 7 give the value of ratio between the characteristic impedance of the compensation line and the value of the resistance corresponding to the mean frequency of the frequency range to be transmitted as a function of the ratio between the resistances R1 and R2 of the antenna system for the frequencies F0 and F0+F1. The three curves 9, 10 and 11 are given for lengths of the compensation line 7 in Figure 6 respectively equal to ¼, ½ and ¾ of a wavelength at the frequency F0.

When it is desired to compensate the variations and resistance in the antenna systems representing simultaneously variations of reactance in the frequency band to be transmitted, these variations in reactance may in the first case be compensated, or at any rate rendered negligible by the employment of lines of a quarter wave and of a semi-wave length short-circuited at their ends, or the variations in resistances compensated by means of devices such as, for example, those shown in Figures 1, 3, 5 or 6. It should be understood that in certain cases it is possible to use a single compensation line for the compensation of reactance variations and resistance instead of several lines in parallel. The characteristic impedance of this single compensation line will, therefore, be determined in such a way as to introduce either in parallel or in series on the terminals of the compensation devices an impedance equal to that which will result from the combination of several quarter wave or semi-wave lines in parallel for a separate compensation.

A part or all the reactive components which should be applied to the terminals of the compensator devices described in the present explanation may be furnished by the variations in reactance of the antennae, or the antennae elements used by suitably dimensioning either the antennae or the antennae elements themselves, or the connecting devices between these antennae elements and their feed lines.

In transmission systems with a large frequency band in addition to the compensation of resistance, or reactance of the radiating elements it is, as a rule, necessary to connect the asymmetrical portions of the system for example, feed lines with coaxial conductors to symmetrical portions, for example, the symmetrical transmission line with relation to the earth. The present invention in particular provides in accordance with one of its aspects particular devices for connection between an asymmetrical line and a symmetrical line arranged so as to play the part of the resistance compensator network at the same time.

Figure 8:
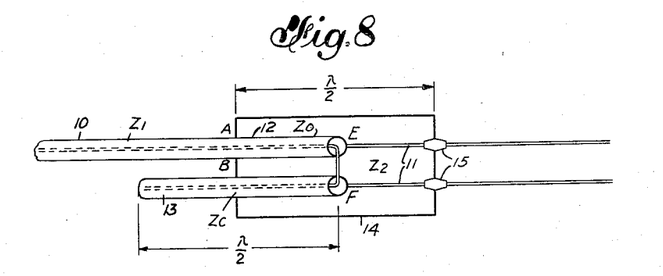
Figures 8 and 9 give an embodiment, and the equivalent electrical circuit diagrams of a resistance compensation device permitting the coupling between a symmetrical portion and an asymmetrical portion in a transmission system.

Figure 8 gives a particular embodiment for the connection of a line in the form of a coaxial cable 10 with a characteristic impedance Z1 to a two-wire transmission line 11 with a characteristic impedance Z2. These two lines are connected one to the other through the medium of a quarter wave inverter transformer 12 with a characteristic impedance Z0 and a series line 13 of a half-wave length, the quarter wave transformer 12 consisting of a section of coaxial cable following directly on the coaxial cable 10 of the line 13 consisting in a section of coaxial cable where the interior conductor also follows the interior conductor of the coaxial cable 10—12. The terminals for connecting the balancing system 11 are indicated at E and F on the ends of the exterior conductors of the coaxial cables 12 and 13 respectively. The characteristic impedance of the line 11 is greater than that of the line 10 so that the compensation line series 13 should be placed in series with the highest point of impedance of the quarter wave transformer 12 as shown on Figure 8.

A metallic box 14 which is earthed contains the whole of the compensation device and is insulated by the bifilar line 11 by means of insulators 15. This box is such that the distances of the points E and F, the points of connection of the conductors of the symmetrical line 11 to their respective insulators 15 are of the same length, for example, quarter wave, so as to conserve the balance of the two wires of the line 11 with relation to the earth. In the embodiment in Figure 8 as in the embodiments of the following figures this metallic box has a length which may be equal to half a wavelength of the mean frequency of the band to be transmitted.

Figure 9:
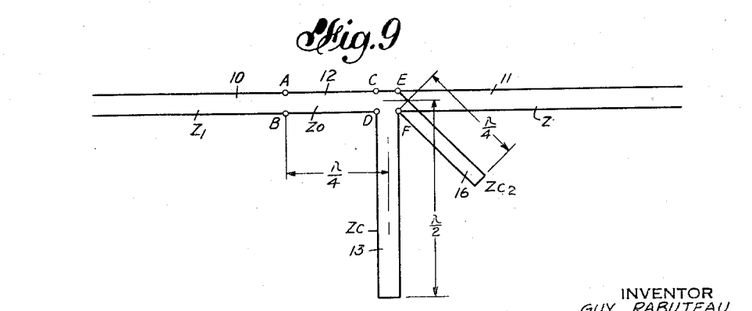

The equivalent electric diagram of the device in Figure 8 is shown in Figure 9 in which the corresponding elements are designed by the same references. In this figure, nevertheless, it should be remarked that a quarter wave line 16 with a characteristic impedance ZC has been shown in parallel to the terminals EF. This additional line represents the effect of the metallic box in the compensation device of the Figure 8. The effect due to this metallic box should be compensated allowing for the presence of this impedance ZC2 in the determinations of the characteristic impedance of the elements 12 and 13.

Figure 10:
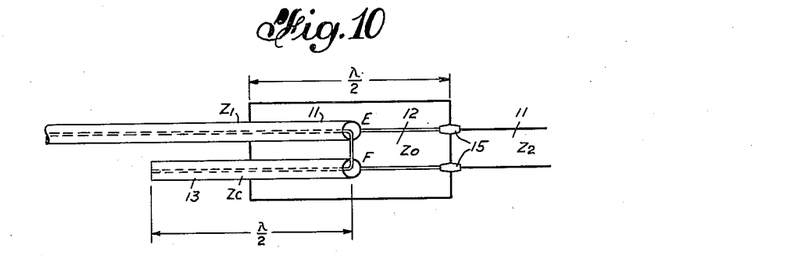
Figures 10, 11 and 12 represent other embodiments of arrangements of this kind.

Figure 10 represents another embodiment where the arrangement is similar to that of Figure 8, but in which the compensation line 13 of the characteristic impedance ZC is placed in series with the asymmetrical transmission line 11 having the quarter wave transformer 12 of characteristic impedance ZO which, in this case, consists of an element of a symmetrical line connected between insulators 15 and exterior conductors of the coaxial sections 12 and 13, the metallic box 14 is the same as in the case of Figure 8, that is to say, as a total length equal to half a wavelength.

Figure 11:
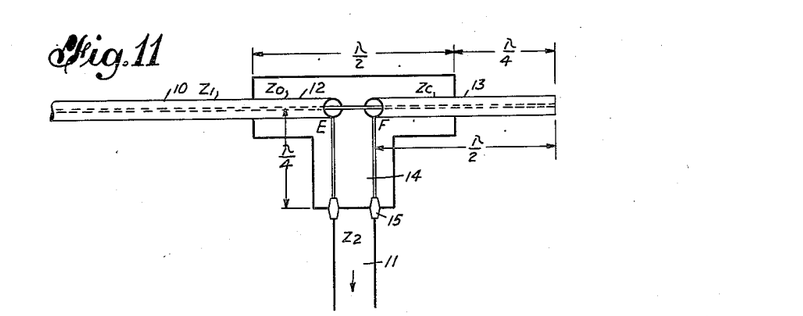

Figure 11 gives another embodiment in which the asymmetrical coaxial line 10 of characteristic impedance Z1 is connected to the symmetrical line 11 of the characteristic impedance Z2 through the medium of a quarter wave transformer 12 with a characteristic impedance Z0 consisting in a section of coaxial cable of a quarter wavelength at the mean frequency of the frequency band, and of a series line of half a wavelength with a mean frequency 13 and characteristic impedance ZC. The half-wave transmission line series 13 is arranged in the extension of the asymmetrical line 10 and of the quarter-wave transformer 12 the central conductor being common to these three lines 10, 12 and 13; the symmetrical line 12 passes through the insulators 15 in the metallic box 14 and is connected at the points E, F to the two exterior conductors of the quarter wave transformer 12 and of the line series 13 respectively.

Figure 12:
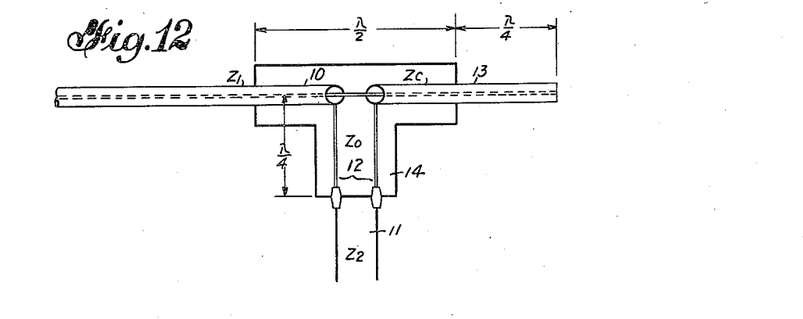

In Figure 12 a similar arrangement is shown where, however, the quarter wave transformer 12 is placed after the series line 13.

In these two figures the dimensions of the metallic box are such that the box constitutes one or more additional quarter wave lines which should be allowed for when determining the characteristic impedance of other elements in such a way as to use them for the desired compensation.

In these embodiments it is possible instead of connecting a single symmetrical line 11 with a characteristic impedance Z2 to the asymmetrical line 10 with a characteristic impedance Z1 to connect to this line any number of lines which go perpendicularly to the terminal box 14.

The arrangements of the asymmetrical line 10 and its impedance series 13 in relation to the quarter wave symmetrical transformer 12 of Figures 8 to 12 may be used for the putting into operation of quarter wave transformers compensated by means of additional lines.

Figure 13:
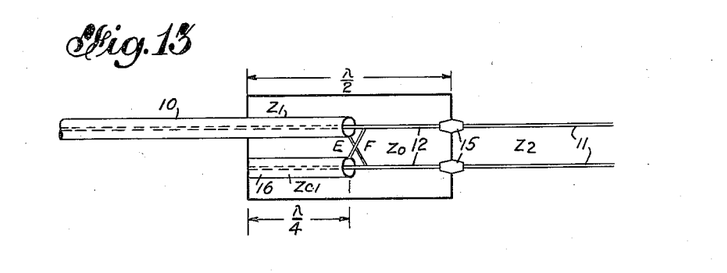
Figures 13 and 15 represent embodiments where the electric circuit diagrams are given by Figures 14 and 16.
Figure 15:
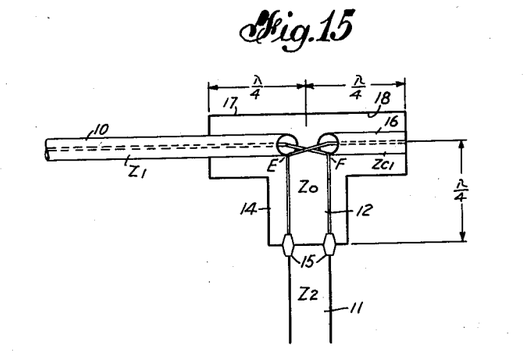

Figures 13 and 15 represent two examples of connection devices of an asymmetrical line 10 to a symmetrical line 11 using a compensation transformer 12 by means of an asymmetrical or coaxial line section 16 with a characteristic impedance ZC1 and a length equal to a quarter wavelength of the mean frequency of the band.

Figure 13 represents a device of this kind in the case where line 11 with an impedance Z2 is arranged in the extension of the line 10 with an impedance Z1 and the Figure 15 represents a device of this kind in the case where the line 11 is arranged perpendicularly with relation to the line 10.

Figure 14:
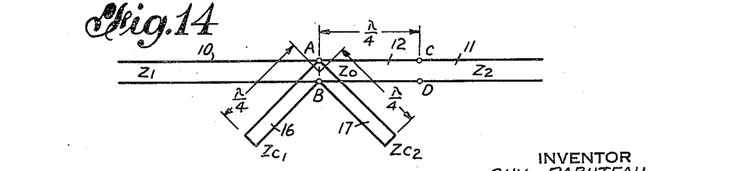
Figure 16:
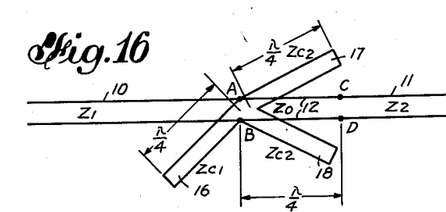

In these two embodiments the metal box 14 is constructed in such a manner as to support two quarter wave lines 17 and 17—18 with characteristic impedances ZC2 respectively. In the embodiment in Figure 13 the material arrangement is such that the two quarter wave lines 17 and 18 are effectively in parallel at the terminals A and B as shown in Figure 14 in the equivalent circuit diagram of the arrangement of Figure 13. In the embodiment in Figure 15 these two quarter-wave lines are effectively in series, one in relation to the other as represented in the equivalent circuit diagram of the arrangement of Figure 15 which is shown in Figure 16, and the whole of these two lines in series is connected in parallel to the terminals A and B; this means that they are connected to the exterior sheaths of the coaxial line 10 and the coaxial section 16 of Figure 15 at points which are at an interval of a quarter wave length from the connection points of the symmetrical transformer conductors 12.

In these Figures 13 and 15 interior conductors of lines 10 and 16 are crossed and connected to points E and F of the transformer 12. It is clear in this case, moreover, that account should be taken in the determination of the different characteristic impedances of the connection system of the impedances ZC2 which are introduced by the walls of the metallic connecting box.

Figure 17 to which reference may now be made represents an example of the embodiment incorporating characteristics of the invention. In this figure eight antennae such as 30, each composed of two frames 31 and 32 are connected two by two to chambers with metallic walls 20, 21, 22 and 23 containing impedance transformers. These chambers 20, 21, 22 and 23 are all fixed on a cylindrical box with metallic wall 24 arranged in the extension of a coaxial cable 10 for the feed of the antennae 30. On the periphery of the four metal chambers as also on the cylindrical box compensation quarter-wave lines 25—25' etc. are supported. The impedance transformers may, therefore, have their individual characteristic impedances regulated by means of devices shown as 26 of Figure 15, and represented in greater detail in Figure 20 in an embodiment. The regulating devices of the effective length of the compensation lines 25—25' are shown as 27. An example of a regulating device of this kind is shown in Figure 21.

Figure 18:
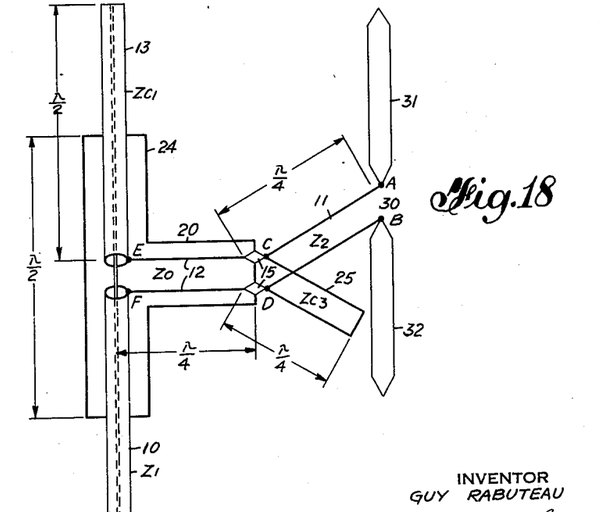

The constitution and operation of a device of this kind will be better understood by referring to Figure 18 which represents diagrammatically the coaxial feed cable constituting an asymmetric feed line 10 and one of the antennae 30 with its symmetrical feed line 11, its impedance transformer 12 and its compensation and connecting structure.

Points A and B of the antenna 30 are connected by a symmetrical transmission line 11 which is quarter wave and has a characteristic impedance 22 at the points C and D of the quarter wave transformer 12 with a characteristic impedance Z0 across the insulators 15 of the metallic box 20. In parallel with this line 11 there is connected at the points C, D a compensation line 25 with a characteristic impedance ZC3 of a quarter wavelength short-circuited at its end.

The points C, D are connected to the points EF by a quarter wave-transformer 12 with a characteristic impedance Z0, the terminal E of this symmetrical transformer being connected to the interior conductor of the coaxial or asymmetrical cable 10 by a compensation line 13, a half wave short-circuited at its extremity and of a characteristic impedance ZC1. This line 13 consists in the example shown of a section of a half-wavelength of the length of the coaxial cable placed in the extension of the asymmetric feed line 10, the point F is directly connected to the exterior conductor of the line 10 of impedance Z1.

The walls of the metallic box 20—24 have been made of such length that they constitute compensation lines of the characteristic impedance ZC2 and of a quarter wavelength short-circuited at their ends and are in parallel between the points E and F.

It is clear by referring to Figure 17 that the two antennae with their transmission line 11 and their compensation line 25 respectively are connected to points C and D of each metallic box 20—23, whilst a single antenna has been represented on Figure 18 for greater simplicity.

The operation of devices of this kind will be clear by referring to the preceding Figures 8 to 14.

Figure 19:
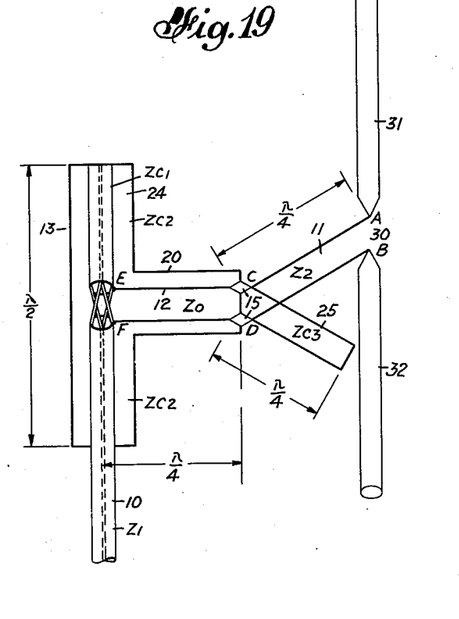

Figure 19 shows a modification of the system of Figure 18. In this modification the line 13 with characteristic impedance ZC1 instead of being placed in series between the end E of the impedance transformer 12 and the interior conductor of the coaxial cable 10 is placed in parallel between the points E and F, that is to say, in parallel with the coaxial cable 10 at the terminals of the impedance transformer 12. The line 13 with characteristic impedance ZC1 is short-circuited at its end and is equal to a quarter wave in length.

Figure 20:
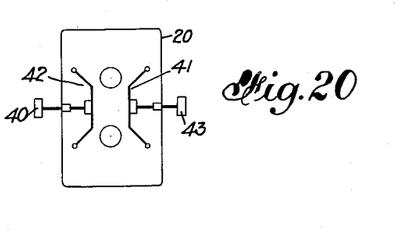
Figure 21:
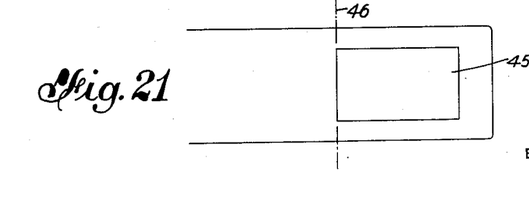

Figure 20 represents in section, one of the chambers 20, 23 containing the impedance transformer 12 of each pair of antennae showing an embodiment of a regulating device of the characteristic impedance of such a transformer. This adjustment is realised by displacing in parallel to one of the surfaces of the chamber 20 the regulating plates 40 and 41 by means of the adjusting screws 42 and 43.

Figure 17 shows at 27 the regulating means and the effective length of the lines 25 to 25', with characteristic impedance ZC3. One means may consist as shown in Figure 21 of a mobile shutter 45 pivoted around an axis 46 and placed close to the end of the short circuit of lines 25—25', between the wires of the lines. The rotation of the shutter 45 around the axis 46 makes it possible to regulate the effect of compensation introduced by the lines 25—25'.

Although the invention has been described by particular examples of embodiments it is obvious that it is not in any way limited to them, but on the contrary, capable of numerous modifications and adaptations without going beyond its domain.

What I claim is:

1. A system for transmitting a frequency band of high frequency electric waves having a source of such waves, a load means therefor presenting to said waves an impedance varying with frequency over said band, coupling means including a symmetrical transformer between said source and load means, and a compensating network including a quarter-wave-length short circuited line connected in parallel with said coupling means and a half wave length short circuited line connected in series with said transformer for introducing reactance to compensate the reactance produced by said parallel connected line and said load means.

2. A system for transmitting a frequency band of high frequency electric waves having a source of such waves, a load means therefor presenting to said waves an impedance varying with frequency over said band, coupling means including a symmetrical quarter wave length transformer between said source and load means, and a compensating network including a quarter-wavelength short-circuited line connected in parallel with said transformer and a half wave length short-circuited line connected in series with said transformer, the impedances of said quarter-wave-length line and said half wave length line being adjusted to compensate for the change in impedance of said load at two frequencies one on either side of the mid-frequency of the operating band.

3. A system for transmitting high frequency waves, according to claim 2, wherein the quarter-wave-length short-circuited line is connected in parallel to the output terminals of said transformer connected to said load means.

4. A system according to claim 2 in which the impedance of said quarter wave length line is adjusted to give a reactance together with said load at two frequencies one on either side of the mid frequency of the operating band equal to $$\frac{R1 \times R2}{\sqrt{R1 \times R2 - R1^2}}$$

where R1 is the resistance of the load at the mid frequency and R2 the resistance of the load at either of said two frequencies and the impedance of said half wave length line is adjusted to be equal in size and opposite in sign to the said reactance.

5. A system for transmitting high frequency waves according to claim 3, including a coupling between said output terminals and said load means comprising a transmission line of a quarter wavelength at said mean frequency and having a characteristics impedance equal to the resistance presented by said load means for said mean frequency.

6. A system for transmitting high frequency waves according to claim 2 wherein the load means comprises a plurality of radiating elements and a plurality of branch feed lines between said elements and in parallel across said transformer.

7. Apparatus for transmitting high frequency waves over a band of frequencies comprising a source of such waves, at least one radiating element presenting a varying resistance over said band, a feedline symmetric with respect to ground and connected to said element, a main line asymmetric with respect to ground and connected to said source, and a compensating network coupling said main and feed lines together, said compensating network including a quarter-wavelength impedance transformer and a half-wavelength short-circuited stub connected in series between said main and feed lines, a metal shield having extending portions surrounding the junction portion of said main and feed lines and providing quarter-wave-length short-circuited lines at the mid frequency of the band at the terminals of said transformer connected to said half-wave-length stub.

8. Apparatus according to claim 7, wherein the main feed line is asymmetric and its outputting end portion has an extension providing a short-circuited half wavelength line at the mean frequency of the band connected serially in the transformer portion of the feed line.

9. Apparatus according to claim 8, a plurality of elements are included with branch lines disposed therebetween, said branch lines being symmetric and the conductors thereof are of such relative lengths and so located in the shield as to maintain their line symmetric.

10. Apparatus according to claim 7, wherein the main feed line is asymmetric and its outputting end portion has an extension providing a short-circuited quarter wavelength line at the mean frequency of the band connected in shunt of the feed line at the connection terminals between main and branch portions thereof.

GUY RABUTEAU.

REFERENCES CITED

The following references are of record in the file of this patent:

UNITED STATES PATENTS

| Number | Name | Date |
|---|---|---|
| 2,184,771 | Roosenstein | Dec. 26, 1939 |
| 2,188,389 | Cork et al. | Jan. 30, 1940 |
| 2,204,712 | Wheeler et al. | June 18, 1940 |
| 2,270,416 | Cork | Jan. 20, 1942 |